May 9, 1961 G. SINGLETON 2,983,377
PROCESS AND APPARATUS FOR CLEANING FRUIT PULP
Filed July 24, 1956

INVENTOR
GRAY SINGLETON

BY *Hyatt Dowell*
ATTORNEYS

United States Patent Office 2,983,377
Patented May 9, 1961

2,983,377

PROCESS AND APPARATUS FOR CLEANING FRUIT PULP

Gray Singleton, Lakeland, Fla., assignor to Shirriff-Horsey Corporation, Ltd., Plant City, Fla.

Filed July 24, 1956, Ser. No. 599,732

12 Claims. (Cl. 209—164)

This invention relates to foods and their ingredients and to the preparation and use of the ingredients as well as to the apparatus and equipment employed.

More particularly, the invention relates to the production of foods from citrus fruits and to the obtaining of juice sacs without undesirable matter including bits of peel, pips or small undeveloped seed and other extraneous matter which gets into the pulp and must be removed before the latter can be sold for food. Bits of peel and seed pips turn brown when cooked and given the appearance of trash in the pulp and prevent or at least greatly interfere with the sale of the pulp as purchasers will not buy the pulp so long as the extraneous material remains therein.

For many years it has been the practice in plants where citrus fruit is processed to extract the juice of oranges, grapefruit, lemons, limes and other kinds and varieties of citrus fruits in a number of different ways.

All of these methods result in juice that has a high percentage of juice cells or juice sacs in the trade referred to as pulp.

It is necessary to remove this pulp before the juice is canned, frozen, concentrated or otherwise processed for human consumption and removal is usually accomplished by straining. This removal is usually performed by screw finishers or paddle finishers, which leave a large amount of pulp after the juice is expressed, or removed. This pulp is useful as food for humans in beverages, pie fillings, candy, cake fillings, in making jam and in many other ways.

Since the beginning of the citrus juice industry, efforts have been made to separate edible pulp from the extraneous material but without any satisfactory solution of the problem or without any commercially successful solution. One of the difficulties is caused by the fact that the specific gravity of the pulp is almost exactly the same as that of the bits of peel, seed pips and other extraneous material with which it is mixed.

It is an object of the invention to provide a simple, easy, rapid, and inexpensive method of separating the valuable pulp from the undesirable extraneous material so that the pulp may be used in the preparation of foods.

Figure 1:
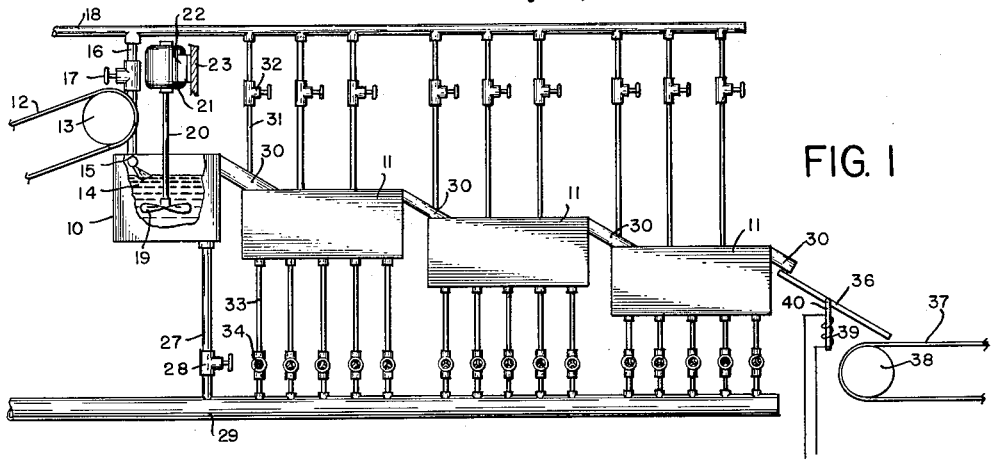
Figure 2:
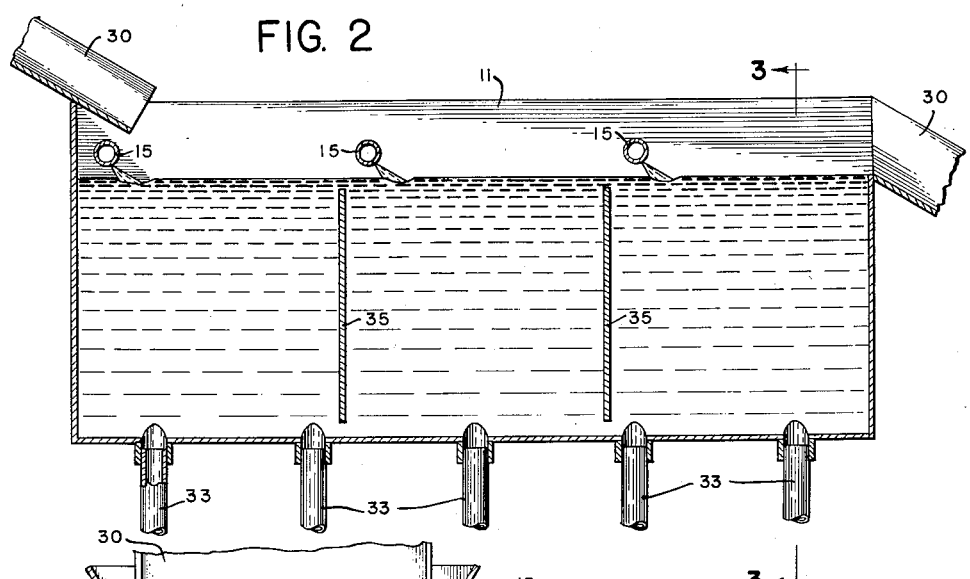

Other objects and advantages of the invention will be apparent from the following description taken in conjunction with the accompanying drawing wherein:

Fig. 1 is a side elevation with parts broken away illustrating one form of the apparatus suitable for treating the pulp;

Fig. 2, a longitudinal section through one of the tanks of Fig. 1; and

Figure 3:
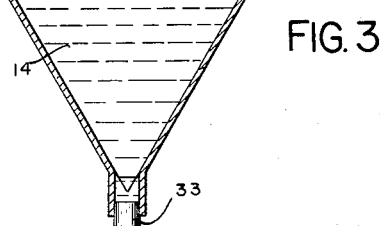

Fig. 3, a transverse section of the tank taken substantially on the line 3—3 of Fig. 2.

In the practice of the process of the present invention the specific gravity of the pulp is changed by the occlusion of air without the addition of a flotation reagent so the valuable pulp will float while the heavier extraneous material will sink. Therefore the lumps must be disintegrated by an agitator so that the pulp may be released from the relatively heavy non-floating extraneous matter and be allowed to float.

Pulp comes from the presses in large compressed lumps or in portions with extraneous material which sinks in the water in the tank 10. The present invention is based on the fact that air will be occluded with the addition of water into the pulp and will cause the pulp to float on water, but will not be occluded with bits of peel, seed pips and other extraneous material.

Air can be applied to the pulp in a number of different ways, such as in froth flotation cells, air jets, agitation and various other methods. In the laboratory it has been found that the cheapest and most effective method is to drive air, carried by jets of water, into a slurry made by agitating the lumps of pulp with water. In practice, the agitation breaks up the lumps of pulp, whips air into the pulp, causing it to float and releases the extraneous material from the pulp so that it can be washed free and allowed to sink. Both agitation and froth flotation will cause pulp to float but only a small amount of extraneous matter can be separated in this way and washing is required to clean the pulp.

Agitation may be accomplished in any convenient manner that will break up the lumps of pulp and produce a slurry of pulp and water, with air occluded in the pulp. A propeller type of agitator with strong water jets is preferred.

A froth flotation cell will float the pulp after the lumps have been disintegrated by the agitator, but it will not clean the pulp. It may be used on rougher cells to take out the larger pieces of extraneous material, however, when jets of water are shot into the slurry produced by agitating the pulp with water, air occludes with the pulp and, at the same time, the extraneous material is washed out of the pulp and released to sink to the bottom.

With continued reference to the drawing, the apparatus of the present invention comprises an agitating tank 10 and one or more separating or classifying tanks 11 of similar character. While it has been found possible to obtain satisfactory results with only one tank, it may be desirable under certain conditions to use additional tanks as shown in the drawing, where difficulty in obtaining a commercially clean product using only one tank is encountered.

Pulp to be treated or processed is brought in by a belt or other type of conveyor 12 extending about a pulley 13 located so that discharge from the belt will fall by gravity into the tank or slurry tub 10 adapted to contain a body of water 14 supplied through a series of spray nozzles 15 from a pipe 16 controlled by a valve 17 from a header 18 connected with a source of supply not shown.

Upon the discharge of pulp from the belt 12 into the body of water 14 mixing is produced by means of an agitator 19 on a shaft 20 extending from a motor 21 into the bottom of the tank. The motor is mounted by bracket 22 on a support 23 which may be movable into and out of position. Water is continuously supplied to the tank or slurry tub 10 through the pipe 16 and is allowed to escape through a drain 27 controlled by a hand valve 28 which connects with a discharge line 29.

In operation water is continuously fed to the tank 10 through the nozzles 15 and a chute 30 directs the overflow into a separation tank 11. From the separation tank water may be directed by a similar chute to a second separation tank and by a similar chute into each succeeding separation tank, if tanks in addition to the first are used.

Each separation tank 11 has diverging sides as illustrated in Fig. 3 with the nozzles 15 of each separation tank supplied with water through lines 31 from the supply line 18 under the control of hand valves 32 and, which separation tanks likewise are provided with lines 33 which connect to the drain line 29 such discharge lines also being controlled by hand valves 34. Any desired number of separation tanks may be employed each being provided with spaced baffles 35, the lower edges being spaced from the bottom of the tank providing small restricted orifices which limit the flow between compartments formed between adjacent baffles 35 and compartments formed between an end of the tank and the adjacent baffle thereby providing a substantially quiescent mass of liquid in the separate compartments. This quiescent mass of liquid permits the extraneous matter to settle since the turbulence and aeration occur only closely adjacent the surface of the liquid. The last tank is provided with a discharge chute 30 depositing upon a dewatering screen 36 over which the pulp gravitates onto a conveyor belt 37 extending around pulleys 38.

Screen 36 preferably is of the vibrating type, the vibration being produced in any well-known manner as for example by means of an electromagnet 39 having a core 40, which may be of the synchronous or "hummer" type.

It has been found advantageous for the separation tank or classifiers to have a V-shaped transverse cross section, like a hog trough, with spigots at the bottom through which the extraneous material flows away continuously. Only enough spigots are opened at any time to carry away the trash that settles out. There must always be enough water in the system to float the pulp over the discharge end of the classifier tank. The discharge end plate in each classifier is slightly lower than the end plate at the feed end and sides of each classifier. This allows the pulp to flow from the discharge end without running over the sides and end of the tank.

The baffle plates 35 are equally spaced in the V-shaped classification tank to minimize water currents in the lower part of the classifier and prevent the remixing of extraneous material with the floating washed pulp.

From the discharge end of the last classified in the series the pulp flows onto the draining screen, which is preferably a vibrating screen in order to free the pulp from surplus water.

It will be apparent that the above invention provides a simple, easily erected and inexpensive and easily maintained system and apparatus by means of which recovery of a substantial amount of fruit pulp which ordinarily would be lost can be accomplished; that the process involves simple steps including the disintegrating of a mass of pulp in a bath of water in the presence of air so that the cells entrap air and become buoyant so that the pulp will float on the top of the body of water while the heavier extraneous matter will sink to the bottom where it can be discharged. Further, by the use of one or more separators or classifiers the removal of extraneous matter is thorough and the end product is highly useful commercially in the preparation of food and ingredients thereof. The fruit pulp after separation from the extraneous matter and from the water may be frozen for storage or for future use and by the addition of various types of flavoring may be used for jams, pies, etc.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. Apparatus for treating edible pulp comprising a first tank into which the pulp material is deposited, means to supply liquid to the pulp, and means to agitate the pulp with sufficient force to effectively mix the pulp with the liquid whereby the pulp will flow on the top due to the agitation and occlusion of air, a first classifying tank, an overflow chute extending from the upper portion of the first tank to said first classifier tank, means to supply liquid spray in the first classifier tank in fine jets to effectively agitate the pulp passing thereunder and to maintain a mixture of air with the pulp, said jets being directed toward a discharge in said first classifying tank, a second classifying tank, an overflow chute extending from the first classifying tank to said second classifying tank, jets arranged in said second classifying tank and directed toward the discharge end of said second classifying tank, an overflow chute extending from the discharge end of the second classifying tank to a third classifying tank jets in said third classifying tank for directing sprays against the surface of liquid in said third classifying tank to agitate the liquid and move the pulp forwardly, a discharge chute extending from said third classifying tank and means for separating the liquid from the pulp for further processing the pulp.

2. A device for separating fruit pulp from extraneous matter comprising a feed conveyor, a series of tanks V-shaped in transverse cross section relative to the direction of flow, located successively at slightly lower elevations, an overflow chute between adjacent tanks so that the overflow from one tank may flow into the next succeeding tank, spray nozzles for supplying water into each of said tanks, an agitating tank, a mechanical agitator in the agitating tank for mixing water and air with the material to be separated to cause the pulp to float and the heavier extraneous matter to sink, baffles in the succeeding tanks, said baffles extending from a location slightly below the level of the overflow of the associated tank to a location closely adjacent the bottom of the associated tank, said tank being free from baffles in a region between the level of said overflow and the top of the baffle waste lines leading from said tanks, a drainage screen located in a position to receive pulp overflowing from the last tank in the series, means for vibrating such screen, and a conveyor for removing cleaned pulp discharged from said screen.

3. A method of separating extraneous material from citrus fruit pulp comprising mixing the citrus fruit pulp with water and agitating the citrus fruit pulp to break it into small particles, transferring the pulp with some of the water to one end of a first water-filled classifying tank, floating the fruit pulp on the water in the classifying tank and continuously adding water from a spray above the surface of the water directed toward the other end of the tank and through the surface of the water and the citrus fruit pulp in the tank to aerate the water, break up the pulp, and move the pulp along the tank while permitting the heavier extraneous material to settle to the bottom, obstructing the flow in a region below the floating fruit pulp between a level closely adjacent the floating fruit pulp spaced below the level of water in the tank and a level just above the bottom of the tank, transferring the floating citrus fruit pulp with some of the water to a similar second classifying tank and repeating the process of aerating the water by a spray from above against the surface of the water and the citrus fruit pulp floating thereon, and repeating the classifying until substantially all of the extraneous material has been removed and substantially pure citrus fruit pulp is passed out of the last classifying tank and thereafter removing a major portion of the water from the citrus fruit pulp.

4. The method according to claim 3 in which the extraneous material is continuously removed.

5. Apparatus for treating particulate material and separating heavier material from light material comprising an elongated tank for liquid, a plurality of baffles extending transversely of said elongated tank and extending upwardly to a height below the level of liquid in the tank, an overflow at one end of the tank with the bottom of the overflow above the level of the top of the partitions to maintain the liquid level above said partitions, inlet means at the other end of the tank for depositing material to be classified, discharge means at the bottom of the tank for removal of heavier material as it settles in the liquid in the tank, a series of jets mounted adjacent the top of each baffle and adjacent the said other end of the tank, said jets being located above the level of the liquid and being arranged to direct the streams from the jets into the liquid and toward the outlet end of the tank whereby material to be classified is agitated and aerated by the jets impinging on the material and on the surface of the liquid to effectively separate the particles of material and permit the heavier material to settle to the bottom and causing the lighter material to flow toward the outlet.

6. The invention according to claim 5 in which the inlet for material is spaced from said other end of the tank and above the liquid so that the material is deposited on the outlet side of the first series of jets.

7. The invention according to claim 6 in which a plurality of tanks are provided at successively lower elevations and the overflow of each tank provides the inlet for the succeeding tank with the discharge of the preceeding outlet being above the liquid in the succeeding tank and spaced beyond the first series of jets of the succeeding tank.

8. Apparatus for cleaning citrus fruit pulp from extraneous material comprising an elongated tank, a plurality of baffles in said tank having their bottom edges terminating short of the bottom and their upper edge substantially parallel to the surface of the liquid in the tank and terminating below the surface of such liquid, said tank being clear of baffles between the upper edges of the said baffles and a location above the surface of the liquid, said tank being provided with an outlet at one end located at an elevation above the top of the baffles to assure that the upper edges of the baffles remain below the surface of the liquid in the tank, a plurality of transverse pipes mounted in said tank and having discharge orifice means extending in the direction of said one end of said tank and toward the surface of the liquid whereby liquid sprayed from said transverse pipes will cause air to be carried into the liquid, drain means at the bottom of said tank for carrying away material settling in the bottom of said tank, the other end and sides of said tank extending well above the surface of the liquid and the outlet in said one end of said tank whereby citrus fruit pulp with extraneous material therein may be continuously supplied to said tank at said other end and be agitated by said jet means and moved along by said jet means and by the motion of the liquid toward said discharge end thereby assuring that all particles of citrus fruit pulp are agitated and aerated whereby the usable citrus fruit pulp will float in the liquid and the unwanted material will settle due to the greater specific gravity of the unwanted material over the aerated pulp.

9. A method of separating extraneous material from citrus fruit pulp comprising mixing the citrus fruit pulp with water and agitating the citrus fruit pulp to break it into small particles, transferring the citrus fruit pulp with some of the water to one end of a first water-filled classifying tank, floating the citrus fruit pulp on the water in the classifying tank and continuously adding water from a spray above the surface of the water directed toward the other end of the tank and through the surface of the water and the citrus fruit pulp in the tank to aerate the water, break up the pulp, and move the citrus fruit pulp along the tank while permitting the heavier extraneous material to settle to the bottom, obstructing the flow in a region below the floating fruit pulp between a level closely adjacent the floating fruit pulp spaced below the level of water in the tank and a level just above the bottom of the tank, transferring the floating citrus fruit pulp with some of the water to a similar second classifying tank and repeating the process of aerating the water by a spray from above against the surface of the water and the citrus fruit pulp floating thereon, and repeating the classifying until substantially all of the extraneous material has been removed and substantially pure citrus fruit pulp is passed out of the last classifying tank.

10. A continuous method of removing extraneous material from de-juiced citrus fruit pulp comprising mixing the citrus fruit pulp with water to provide a uniform suspension, overflowing the mixture of pulp and water into one end of a first compartmented classifying tank by gravity flow, spraying water from above the level of the discharge outlet of said first classifying tank and from the ends of the compartments adjacent said one end into the liquid and toward the discharge outlet, continuously supplying the water and pulp mixture to said one end of the first classifying tank, obstructing the flow of liquid in the first classifying tank in a region between a location slightly below the surface of the liquid in the tank and slightly above the bottom of the tank with any flow in the bottom restricted to a small orifice, causing the extraneous material to collect in the bottom portion of the tank, removing the extraneous material from the bottom of the tank, discharging the pulp and the overflow water from the discharge outlet of said first classifying tank into one end of a similar second compartmented classifying tank, obstructing the flow of liquid from one end of the second classifying tank toward the discharge outlet end of the second classifying tank in a region between a location slightly below the surface of the liquid and a location slightly above the bottom of the tank with any flow in the bottom restricted to a small orifice causing extraneous material to collect in the bottom, spraying water from above the level of the discharge outlet of said second classifying tank and from the ends of the compartments adjacent said one end into the liquid and toward the discharge outlet, thereby assuring the breaking away of the extraneous material from the major mass of the pulp, and passing the pulp and water mixture to additional classifying tanks until a standard of purity is obtained substantially exceeding the purity heretofore obtained.

11. A classifying tank for use in separating aerateable material from extraneous material comprising an elongated tank of V-shaped cross section having a discharge outlet adjacent the top, a plurality of V-shaped baffles mounted in said tank with the upper edges spaced from the top of the tank and below the discharge outlet and the lower edge spaced from the bottom of the tank providing a small orifice at the bottom restricting the flow between the compartments formed between adjacent baffles, a spray located above the discharge outlet, above the normal level of the liquid and above the upper edges of the baffles with one spray adjacent the end of the tank away from the discharge outlet, with the spray directed into the level of the liquid and toward the discharge outlet, similar sprays being located adjacent each baffle and on the side thereof adjacent the outlet directing liquid into the mass of liquid and material to be classified and toward the discharge outlet end producing turbulence in such area and aerating the material to be classified, and means to remove extraneous material from the bottom of the compartments.

12. The invention according to claim 11 in which the nozzles are in the form of pipes extending the complete width of the tank and the sprays are uniformly applied to the surface.

References Cited in the file of this patent

UNITED STATES PATENTS

| | | |
|---|---|---|
| 92,594 | Eltonhead | July 13, 1869 |
| 1,090,255 | Walsh et al. | Mar. 17, 1914 |
| 1,171,891 | Sailer | Feb. 15, 1916 |
| 1,224,350 | Adams | May 1, 1917 |
| 1,236,382 | Epler | Aug. 7, 1917 |
| 1,312,976 | Groch | Aug. 12, 1919 |

(Other references on following page)

UNITED STATES PATENTS

| | | | |
|---|---|---|---|
| 1,333,287 | White | Mar. 9, | 1920 |
| 1,545,636 | Chance | July 14, | 1925 |
| 1,605,172 | Chance | Nov. 2, | 1926 |
| 1,624,163 | Dolbear | Apr. 12, | 1927 |
| 1,656,271 | Downs | Jan. 17, | 1928 |
| 2,274,401 | Dromgold | Feb. 24, | 1942 |
| 2,281,590 | Newton | May 5, | 1942 |
| 2,381,369 | Sconce | Aug. 7, | 1945 |
| 2,450,398 | Sanders | Sept. 28, | 1948 |
| 2,509,904 | Bruce | May 30, | 1950 |
| 2,530,676 | Berg | Nov. 21, | 1950 |
| 2,606,660 | Klepetko et al. | Aug. 12, | 1952 |
| 2,697,384 | Craig | Dec. 21, | 1954 |
| 2,711,822 | Novak | June 28, | 1955 |

FOREIGN PATENTS

| | | |
|---|---|---|
| 16,868 | Great Britain | 1889 |

OTHER REFERENCES

"Western Canner and Packer," April 1932, vol. 23, No. 13, pp. 30, 32, 33.

"Food and Food Products," Jacobs, vol. 1, Second Edition, Interscience Publishers, Incorporated, New York, 1951, pp. 488–489.